United States Patent [19]
Harrison et al.

[11] 3,920,231
[45] Nov. 18, 1975

[54] RUBBER SPRINGS

[75] Inventors: Reginald Harrison, Oadby; Michael John Smedley, Coalville; Bernard Ridge Wing, Thurnby, all of England

[73] Assignee: Dunlop Limited, London, England

[22] Filed: Apr. 16, 1973

[21] Appl. No.: 351,344

[30] Foreign Application Priority Data
Apr. 17, 1972 United Kingdom............... 17554/72

[52] U.S. Cl. .................. 267/35; 105/224.1; 267/3; 267/63 R
[51] Int. Cl.²........................................ B60G 11/62
[58] Field of Search............. 267/35, 3, 63 R, 63 A, 267/153, 152, 121, 65 R

[56] References Cited
UNITED STATES PATENTS

| | | | |
|---|---|---|---|
| 2,842,358 | 7/1958 | Nardi | 267/63 R |
| 3,020,856 | 2/1962 | Hirst | 267/63 R |
| 3,262,693 | 7/1966 | Hirst | 267/3 |

FOREIGN PATENTS OR APPLICATIONS

| | | | |
|---|---|---|---|
| 781,896 | 8/1957 | United Kingdom | 267/35 |

*Primary Examiner*—Richard A. Schacher
*Assistant Examiner*—Jeffrey V. Nase
*Attorney, Agent, or Firm*—Stevens, Davis, Miller & Mosher

[57] ABSTRACT

A rubber spring comprising an annular rubber member bonded between metal end plates and containing an inelastic fluid which modifies the spring characteristics. The spring may be in the form of several rubber members separated by interleaving plates. The invention also provides a railway suspension using the spring which allows correction of ride height by control of the fluid volume.

7 Claims, 9 Drawing Figures

RUBBER SPRINGS

This invention relates to rubber springs and in particular to such springs for use in vehicle suspensions.

According to one aspect of the present invention a rubber spring comprises at least one annular resilient rubber member bonded between a pair of metal end plates to provide a central closed chamber and a substantially inelastic fluid filling said chamber whereby in compression or extension of the spring the pressure of the fluid acts on the annular rubber member to modify the resistance to compression and extension of the spring.

The spring may be of the type having several rubber members bonded in a stack between the end plates and having annular metal interleaves bonded between adjacent rubber members. In this case each interleaving plate is annular to provide a common chamber for the fluid.

The fluid is preferably introduced to the spring by means of a closable inlet in one end plate and may be at atmospheric pressure, above atmospheric pressure or below atmospheric pressure dependent on the required spring characteristics of fitted length, spring rate in compression or extension and spring rate in shear.

According to another aspect of the invention a railway vehicle suspension comprises at least two rubber springs of the type described supporting each axle-box of the vehicle from the underframe of the vehicle, each spring being mounted at a downward inclination to the horizontal plane and acting in shear and compression to support the vehicle sprung weight.

In a preferred embodiment of a suspension according to the invention four springs of the aforementioned type are used to support each axle-box, two to each spring unit and intermediate stop means are provided attached to the axle-box whereby all four springs are deflected in the tare loaded condition of the vehicle and further loading causes the said intermediate stop means to engage the springs between the springs of each unit and cause the additional load to deflect only the outer pair of springs of each suspension unit so that a step is obtained in the suspension rate characteristic.

The fluid is preferably introduced into the springs to provide the required vehicle ride height and the inlets are then closed. Adjustable piston means may be provided to allow later adjustment of the ride height to compensate for tare load changes and spring settlement.

According to yet another aspect of the invention an internal baffle may be provided inside the central chamber of the spring. The baffle is attached to one end plate or alternatively to one of the interleaving plates and provides resistance to fluid flow in the chamber which acts as damping for movement of the spring. The baffle may be arranged to provide different resistances to fluid flow in different directions and thus, for example, shear deflection of the spring can be resisted to different degrees in different directions. The baffle may be provided with holes or apertures to allow fluid flow therethrough in addition to the flow around the baffle and one-way valves can be incorporated in said holes to provide different damping factors in opposite directions of movement.

Some embodiments of the invention will now be described, by way of example only, in conjunction with the accompanying diagrammatic drawings in which.

Figure 1:
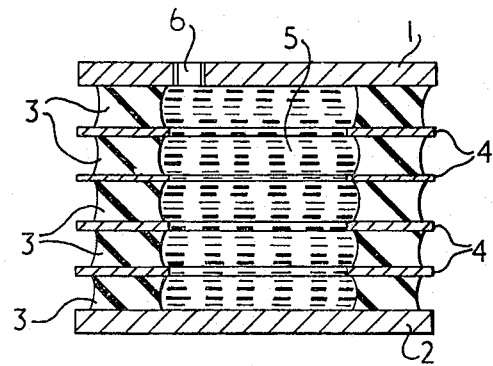
FIG. 1 is a longitudinal cross-section of a spring according to the present invention.

As shown in FIG. 1 a spring comprises two parallel spaced-apart steel end plates 1, 2 and a series of annular rubber members 3 stacked between the end plates 1, 2. Between adjacent rubber members are placed interleaving plates 4 which are annular in outline and are formed from steel plate. The rubber members 3 are bonded to the interleaving plates 4 and to the end plates 1, 2 so that a central closed chamber cavity 5 is formed within the spring.

The central chamber 5 is filled with a mixture of alcohol and water by means of an aperture 6 provided in one end plate 1 communicating with the chamber 5 and closed by a plug (not shown).

The annular rubber members 3 and annular interleaving plates 4 may be circular or rectangular in plan. Furthermore, the plates 1, 2 and 4 may be flat or bent to form a spring of the type known as a chevron spring.

Figure 2:
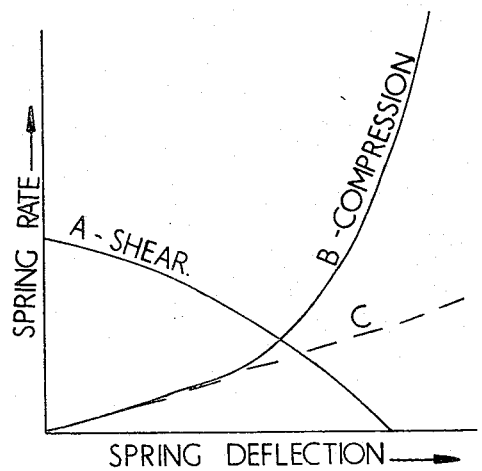
FIG. 2 shows the characteristics of the spring of FIG. 1.

The characteristics of the spring are shown in FIG. 2 in which spring rate is plotted against spring deflection for both shear deflection (curve A) and compressive deflection (curve B). Curve C shows by way of comparison the compressive deflection curve for a spring without the fluid filling. The shear characteristic A is the same whether or not fluid is in the chamber 5 but due to the pressure change in the fluid acting outwardly on the annular rubber members 3 the compressive characteristic is changed by the fluid and the spring rate increases with deflection more rapidly than without the fluid in the spring. The fluid also has an effect on the spring rate when subjected to tension (not shown).

Furthermore, adjustment of the fluid volume, i.e., by pressurizing the fluid or filling under vacuum conditions, allows adjustment of the free length of the spring.

The presence of the fluid allows the shear rate to be made smaller than would otherwise be the case for a given compression rate.

Figure 3:
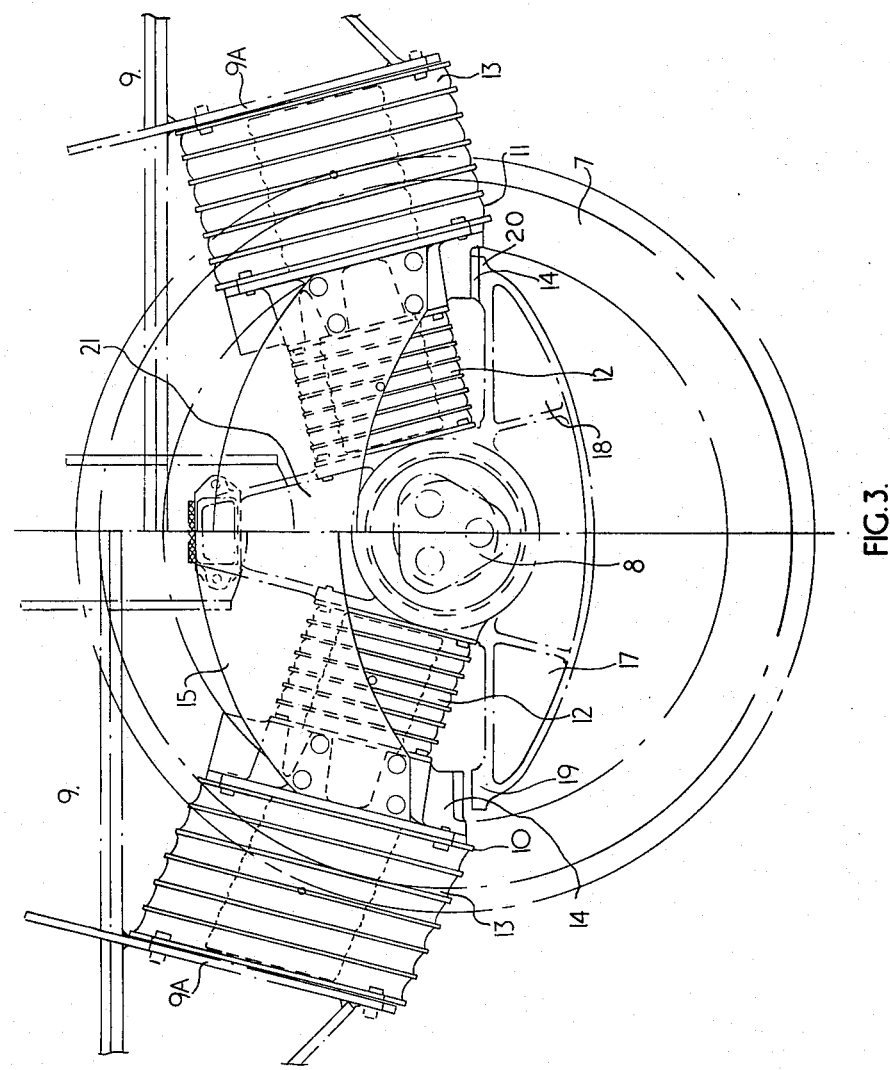
FIG. 3 is a side view of a railway vehicle suspension showing in one half the tare loaded condition and in the other half the fully laden condition.
Figure 4:
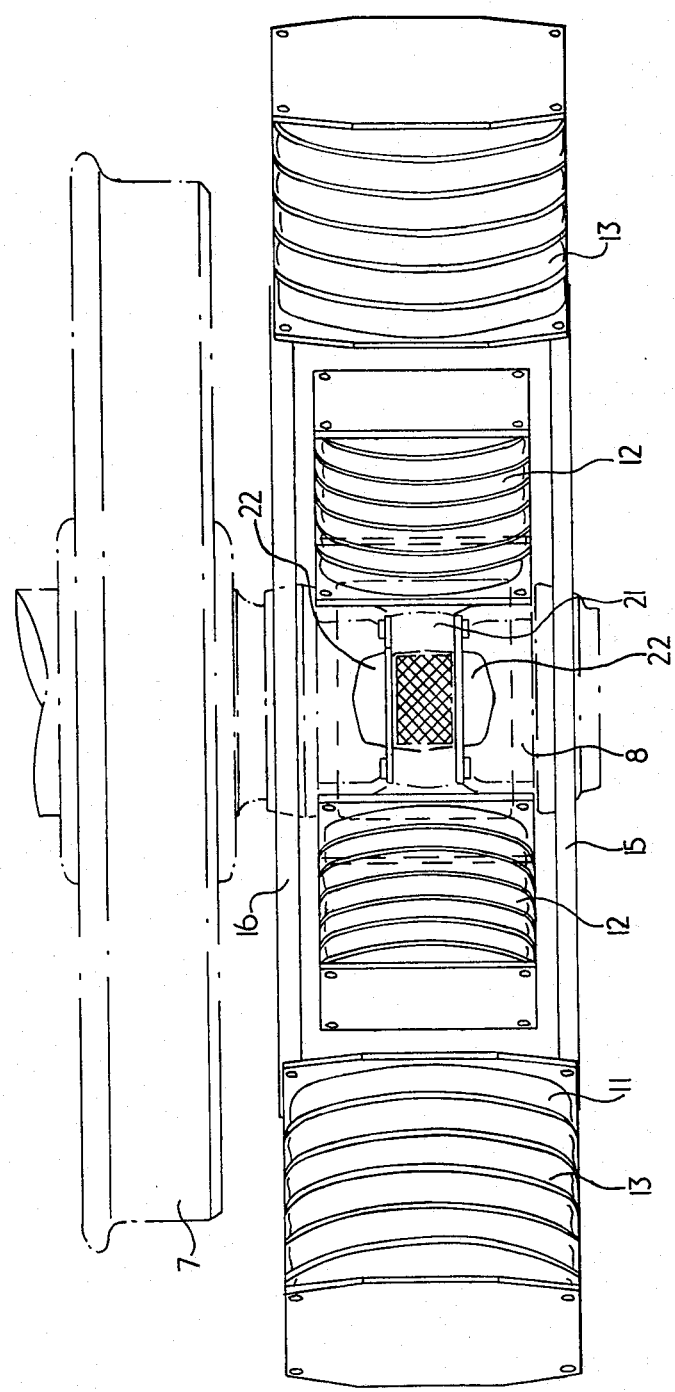
FIG. 4 is a plan view of FIG. 3.
Figure 5:
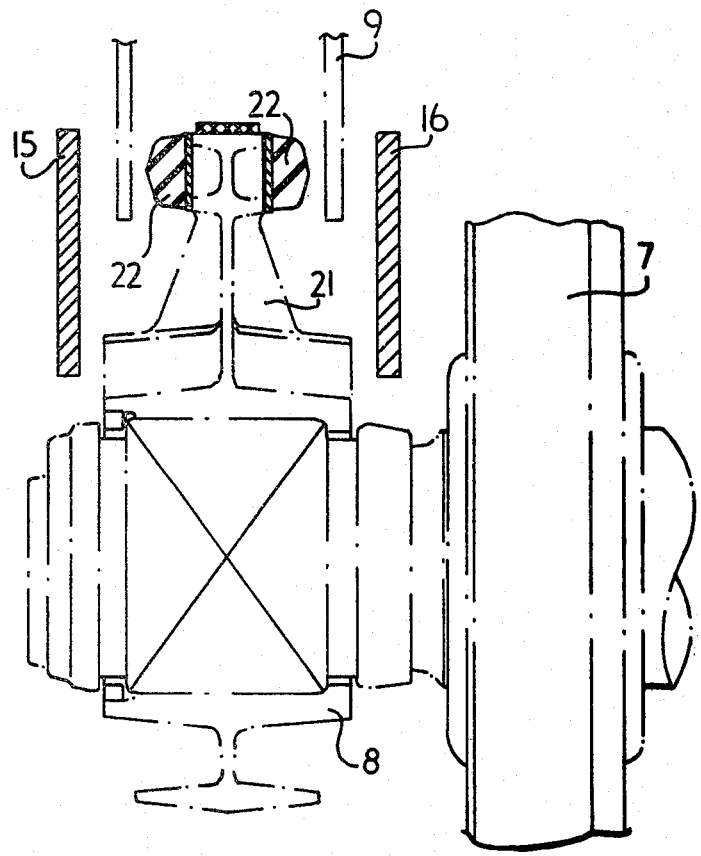
FIG. 5 is an end view on V—V of FIG. 3.

An application of springs of the above type to a railway vehicle suspension is shown in FIGS. 3, 4 and 5.

A wheel 7 is carried on one axle which runs in bearings in an axle-box 8. The axle-box is supported from the vehicle underframe 9 by means of two spring sets 10,11 mounted in a plane parallel to the longitudinal center plane of the vehicle, each set abutting at one end one side of the axle-box and at the other end an inclined abutment plate 9A.

Each spring set comprises two springs 12,13, each of the type described above, connected end-to-end by a spacer block 14 so that they act for part of their deflection movement in series. The spring sets 10,11 are inclined downwardly to the axle-box so that the weight of the vehicle loads the springs sets 10,11 simultaneously both in shear and compression.

The spacer block 14 of the spring set 10 is rigidly connected to the spacer block 14 of the spring set 11 by means of a pair of curbed parallel plates 15,16 which are mounted at either side of the springs and curve upwardly to provide clearance for the axle-box.

The axle-box 8 has provided two projecting arms 17, 18 which project from the lower portion of the axle-box in the longitudinal direction of the vehicle and provide abutments 19,20 about 2.5 cms below the spacer blocks 14 when the vehicle is in the tare-loaded condition. The abutments 19, 20 and the spacer blocks 14 form intermediate stop means, the function of which will later be described.

An upwardly extending arm 21 (see FIGS. 3, 4 and 5) is formed on the top of the axle-box 8, and a pair of rubber cushioning members 22 are provided one either side of the upward arm 21 in a direction transverse of the vehicle. The sideframe 9 of the vehicle extends on either side of the upward arm 21 as shown in FIG. 5 leaving a space of about 25 mm for transverse movement of the upward arm 21 in a direction transverse to the vehicle center line.

Figure 6:
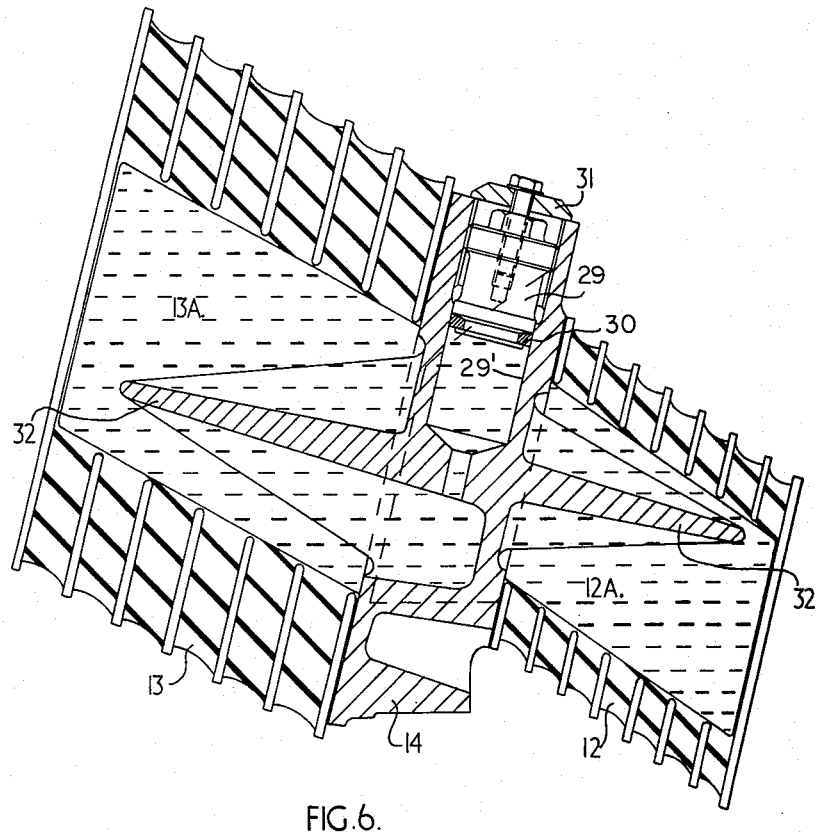
FIG. 6 is a sectional side view of a spring unit of FIG. 3.
Figure 7:
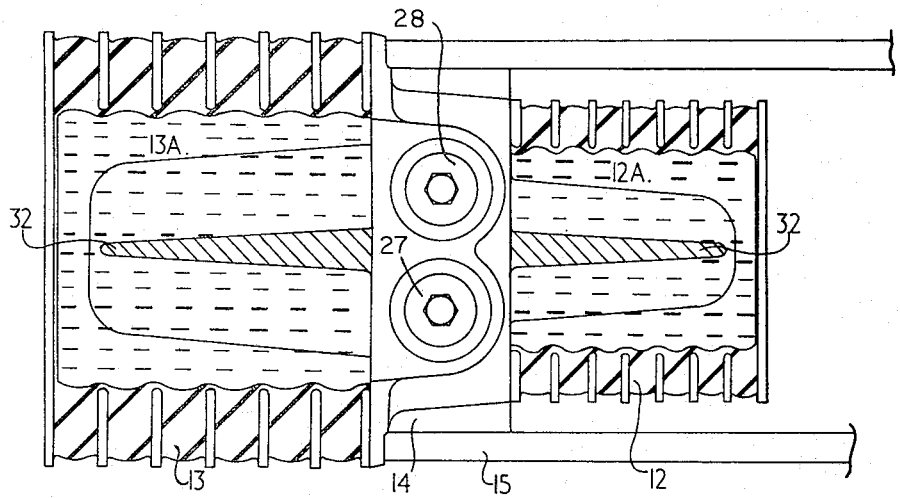
FIG. 7 is a part-sectional plan view of the spring unit.

A spring set 10,11 is shown in greater detail in FIGS. 6 and 7. Spring 12 has a central chamber 12A and spring 13 has a central chamber 13A. The chambers are connected to separate fluid inlet ports 27, 28. Each port has provided a piston 29 carrying a seal 30 which is movable by screw-thread means 31 in a cylinder 29' so that fluid may be displaced into the chamber of the spring. The spacer block 14 provides the one end plate for each of the springs 12,13 and baffles 32 are provided extending from the spacer block 14 into the chamber 12A, 13A of each spring. The baffles are generally cross-like in cross-section and provide resistance to fluid flow within each chamber.

In operation, in the unloaded or tare condition, the pistons are adjusted by operating the screws 31 until the vehicle ride height is as required. This is set to provide a clearance of about 25 mm between the spacer blocks 14 and the abutments 19,20 on the arms 17,18.

The vehicle is then suspended on all four springs at each axle-box at the tare load. When the vehicle is further loaded, intermediate stop means operate so that the spacer blocks 14 contact the abutments 19,20 and the vehicle is then suspended only by the outer springs 13, the spring rate then being higher than in the tare condition.

The baffles 32 act to restrict fluid flow within the chambers 12A, 13A and thus damp in all directions shear deflections of the springs.

The upward arm 21 and rubber cushions 22 restrict transverse axle movement of the vehicle by abutment of the cushions 22 with the sideframes 9.

A typical installation is as follows which is suitable for a rigid bulk-liquid four-wheeled wagon.

| | |
|---|---|
| Gross vehicle weights | 50 tons laden |
| | 15 tons empty |
| Vertical bounce frequency | 2.4 Hz |
| | empty and laden |
| Change of height | 63.5 mm |
| | empty to laden |
| Transverse frequency | 1.0 Hz |
| | empty and laden |
| Longitudinal flexibility | 0.2 to 0.4 tons/mm |
| | empty |

Figure 8:
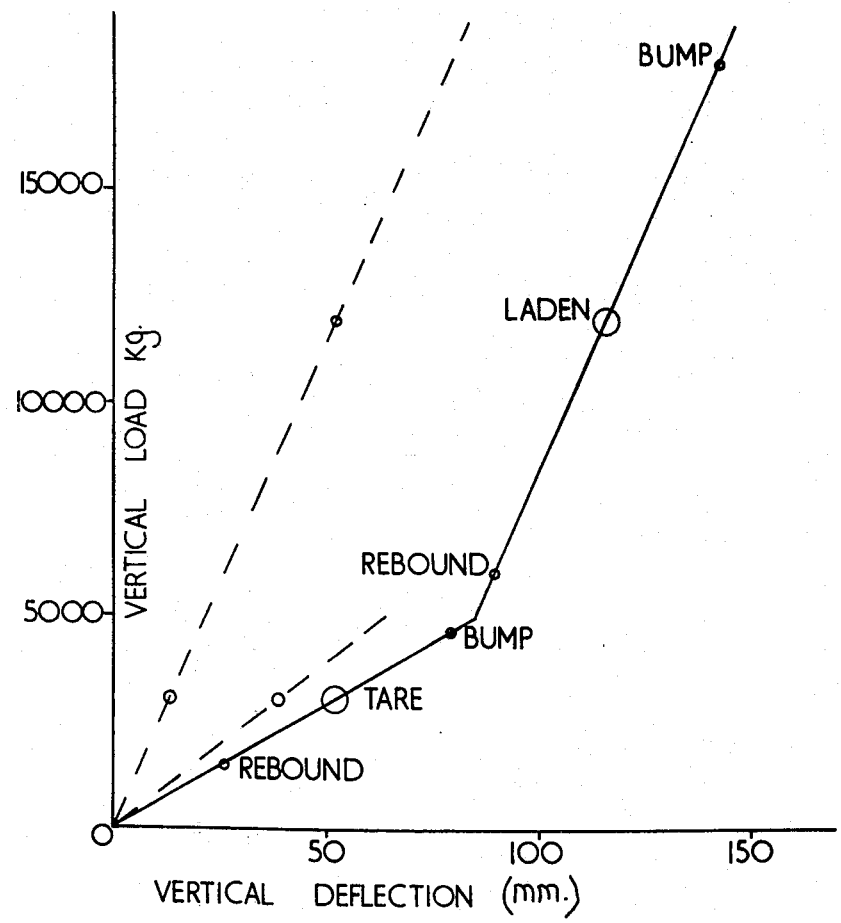
FIG. 8 shows the characteristics of a vehicle suspension as in FIGS. 3–8.

FIG. 8 shows the load/deflection characteristics for this installation, (the broken lines showing the characteristics for the spring separately).

The suspension system is thus one providing dual spring rates, height adjustment and integral damping. The baffles may be of different areas or may be provided with transfer holes or ports to provide damping which differs for movement of the spring in various directions.

Fluids other than an alcohol and water mixture may be used dependent on the degree of damping required and the working conditions particularly with regard to temperature.

Figure 9:
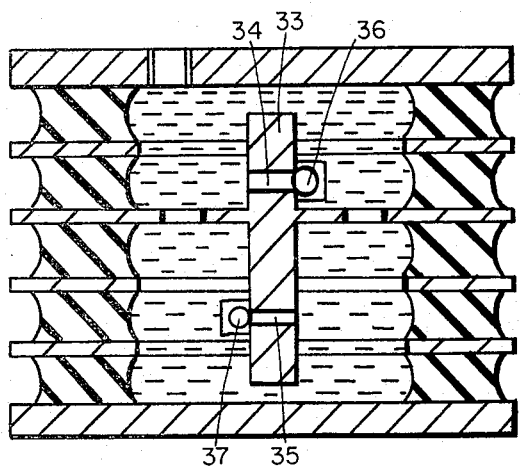
FIG. 9 is a longitudinal cross-section of a spring according to a further aspect of the invention.

According to yet another aspect of the invention an internal baffle 33 may be provided inside the central chamber of the spring as shown in FIG. 9. The baffle may be attached to one end plate or, as shown in FIG. 9, to one of the interleaving plates and provides resistance to fluid flow in the chamber which acts as damping for movement of the spring. The baffle 33 may be arranged to provide different resistances to fluid flow in different directions and thus, for example, shear deflection of the spring can be resisted to different degrees in different directions. The baffle may be provided with holes or apertures 34 and 35 to allow fluid flow therethrough in addition to flow around the baffles and one-way valves 36 and 37 can be incorporated in the holes 34 and 35 to provide different damping factors in opposite directions of movement.

Having now described our invention - What we claim is:

1. A spring comprising:
   means defining a closed chamber, said means comprising a pair of rigid metal end plates, several rubber members bonded between said end plates to form a stack, and annular interleaving plates bonded between adjacent rubber members,
   damping means within the chamber, and
   a liquid filling said chamber whereby in displacement of the spring the pressure of the liquid acts on the annular rubber member to modify the resistance to displacement of the spring.

2. A spring according to claim 1 wherein said liquid is a mixture of alcohol and water.

3. A spring according to claim 1 wherein said means further comprises a liquid inlet in one end plate and a fluid cylinder containing a piston, whereby movement of the piston causes variation in the volume of liquid within the spring.

4. A spring according to claim 1 wherein the damping means comprises a baffle for restricting liquid movement within the chamber.

5. A spring according to claim 4 wherein the baffle has provided at least two different area apertures each having a one-way-valve so that liquid may only pass in one direction whereby damping in different directions may be controlled.

6. A spring according to claim 4 wherein the baffle is attached to an end plate.

7. A spring according to claim 4 wherein the baffle is attached to an interleaving plate.

* * * * *